United States Patent [19]

Hamel et al.

[11] 3,843,895

[45] Oct. 22, 1974

[54] TWO-WAY OR CIRCUIT USING JOSEPHSON TUNNELLING TECHNOLOGY

[75] Inventors: Harvey C. Hamel; Charles A. Kunzinger; William K. Stelzenmuller, all of Poughkeepsie, N.Y.

[73] Assignee: International Business Machines Corporation, Armonk, N.Y.

[22] Filed: June 29, 1973

[21] Appl. No.: 374,821

[52] U.S. Cl. .................. 307/212, 307/218, 307/245, 307/306

[51] Int. Cl. ..................... H03k 19/168, H03k 19/30

[58] Field of Search ........... 307/212, 218, 245, 277, 307/306; 317/234 T

[56] References Cited

UNITED STATES PATENTS

| | | | |
|---|---|---|---|
| 3,239,787 | 3/1966 | Reeber | 307/277 X |
| 3,281,609 | 10/1966 | Rowell | 307/245 |
| 3,369,127 | 2/1968 | Kaufman et al. | 307/212 |
| 3,430,064 | 2/1969 | Meng | 307/306 X |
| 3,521,133 | 7/1970 | Beam | 317/234 T |
| 3,626,391 | 12/1971 | Anacker | 307/245 X |
| 3,764,905 | 10/1973 | Zappe | 307/306 X |

OTHER PUBLICATIONS

Landman, "Josephson Technology Inverter"; IBM Tech. Discl. Bull., Vol. 15, No. 9, pp. 2,753–2,755; 2/1973.

*Primary Examiner*—Rudolph V. Rolinec
*Assistant Examiner*—L. N. Anagnos
*Attorney, Agent, or Firm*—Harold H. Sweeney, Jr.

[57] ABSTRACT

A logical OR circuit using Josephson tunnelling devices is provided having a first, second and third gate. Each of the gates includes a first and second branch circuit in parallel. A first Josephson tunnelling device is located in the first branch circuit and a second Josephson tunnelling device is located in the second branch of each of said first, second and third gates. A DC current is applied to each of the first, second and third gates. A control means provides the logic inputs to each of the first and second Josephson devices in each of said gates to cause the selected devices to switch to their finite voltage state causing the input current to flow in the other one of the first and second branch circuits. First sensing means connected in series are located between the first branches of the first, second and third gates which response to the current flow in one or both of the first branches of the first and second gates to provide a sensing current pulse to the control means for the Josephson tunnelling junction in the second branch of the third gate switching it into its finite voltage state thereby causing the current to flow through the opposite branch in the third gate representing current flow in one or more of the first branches of the first and second gates representing an OR function. Second sensing means connected in parallel are located between the second branches of the first, second and third gates which respond to the current flow in the second branch of both the first and second gates to provide an input to the control means for the first Josephson device of the third gate causing it to switch to its finite voltage stage thereby causing the input current to the third gate to flow through the opposite branch thereof.

9 Claims, 4 Drawing Figures

TWO-WAY OR CIRCUIT USING JOSEPHSON TUNNELLING TECHNOLOGY

BACKGROUND OF THE INVENTION

1. Field of the Invention

This invention relates to circuitry using Josephson tunnelling devices and more particularly, to superconductive circuits for producing an OR function at Josephson tunnelling device switching speeds which requires no resetting.

2. Description of the Prior Art

Josephson tunnelling devices are superconductive elements exhibiting a zero voltage current state in which pair tunnelling exists, and a finite voltage state in which single particle tunnelling exists. The existence of a zero voltage state in a superconductive tunnel junction was first described in July 1962 by B. D. Josephson. Since that time, these devices have been proposed for applications in memory and logic. For instance, U.S. Pat. No. 3,626,391 describes a superconductive memory using Josephson tunnelling devices in which memory cells comprised of superconducting loops are used. Josephson junctions determine the direction of current flow in the superconducting loops and they are also used for sensing the current in these loops.

U.S. Pat. No. 3,281,609 describes a logic device using Josephson tunnelling junctions in which the magnetic fields applied to the junction cause the junction to switch voltage states, depending upon whether or not the maximum zero voltage current through the junction is exceeded. Externally applied magnetic fields are used to lower the threshold current (maximum zero voltage current) of the tunnel junction so that switching to a finite voltage state occurs.

U.S. Pat. application Ser. No. 267,841 describes superconductive circuitry using Josephson tunnelling devices connected to a transmission line having a termination such that reflections do not result when the Josephson tunnelling device switches between two stable voltage states, in accordance with applied input signals.

A logical OR circuit using Josephson tunnelling devices has been disclosed in U.S. Pat. application Ser. No. 374,822. One of the Josephson devices in one of the branch circuits of this superconductive arrangement requires an operation in response to a resetting pulse before the circuit can be again operated.

From the above it can be seen that Josephson tunnelling junctions have been applied to various circuits. However, it is not known how to provide a logic circuit utilizing Josephson devices in which the circuit has a speed which is dependent on the speed of switching of the Josephson devices only and which does not require a reset cycle between successive uses.

Accordingly, it is the main object of the present invention to provide a logical OR circuit using Josephson tunnelling devices which eliminates the reset cycle between successive uses.

It is another object of the present invention to provide a logical OR circuit using Josephson tunnelling devices which includes a self-resetting feature.

It is a still further object of this invention to provide Josephson tunnelling device circuits which can be easily fabricated using conventional planar technology.

It is another object of the present invention to provide a logical OR circuit using Josephson tunnelling devices in which no standby power for storage of information is required.

BRIEF SUMMARY OF THE INVENTION

A logical OR circuit using Josephson tunnelling devices is provided which comprises a first, second and third gate having a first and second branch circuit in parallel in each of the gates. A first Josephson tunnelling device is located in each of the first branch circuits and a second Josephson tunnelling device is located in the second branch of each of the first, second and third gates. Control means for applying inputs to each of the first and second Josephson devices in each of the gates is provided to cause the selected devices to switch to their finite voltage state causing the input current to flow in the other one of said first and second branch circuits. First and second sensing means are located between the gates. The first sensing means of the first and second gates are connected in series and respond to the current flow in one or both of the first branches of the first and second gates to provide a sensing current pulse to the control means for the Josephson tunnelling device in the second branch in the third gate switching it into its finite voltage state thereby causing the current to flow through the opposite branch in the gate representing current flow in one or more of the first branches of the first and second gates representing the OR function. The second sensing means of the first and second gates are connected in parallel and respond to the current flow in the second branch of both the first and second gates to provide an input to the control means for the first Josephson device of the third gate causing it to switch to its finite voltage state thereby causing the input current of the third gate to flow through the opposite branch thereof.

DETAILED DESCRIPTION OF THE PREFERRED EMBODIMENT

Figure 1:
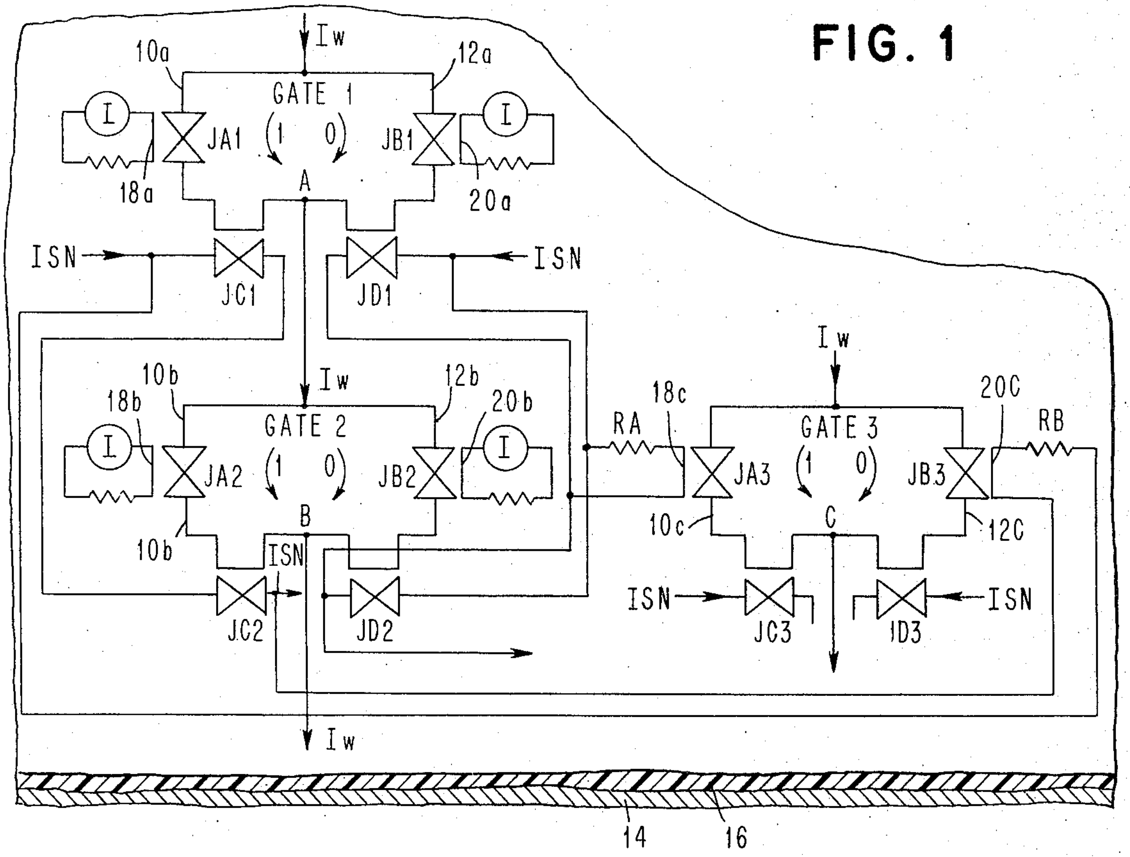
FIG. 1 is a schematic illustration of a superconductive OR logic circuit utilizing Josephson tunnelling devices.

FIG. 1 is a schematic diagram of a superconductive logic OR circuit utilizing Josephson tunnelling junctions in a high speed arrangement.

Each of the circuits consists of a first, second and third gate formed of a first and second branch circuit 10,12 in parallel. Each of the branches 10 and 12 contain a Josephson tunnelling junction JA(1,2,3) and JB(1,2,3), respectively. Each of the Josephson tunnelling junctions JA(1,2,3), JB(1,2,3) have a control conductor 18,20 associated therewith which, when energized by an input logic pulse, cause magnetic coupling to the junction such that the threshold current value, that is, the current value at which the device switches from the no voltage current condition to the finite voltage current condition is lowered such that the energizing current is above the threshold value, thereby causing the Josephson junction to switch to its finite voltage state. The gates are energized by a current Iw in series as shown in FIG. 1. Initially, the input current Iw divides between the two branches 10,12 of the gate since the Josephson junctions JA(1,2,3), JB(1,2,3) are in the no voltage state. Once one of the junctions is caused to switch into its finite voltage state by the current pulse on the control conductor the input current to the gate flows through the opposite branch. That is, the branch in which the Josephson device is still in its no voltage state. It has been arbitrarily selected that the flow of current in the first branch 10 will be considered as containing a logical "1" value and the flow of the current in the branch 12 will be considered as a logical "0" value.

Figure 4:
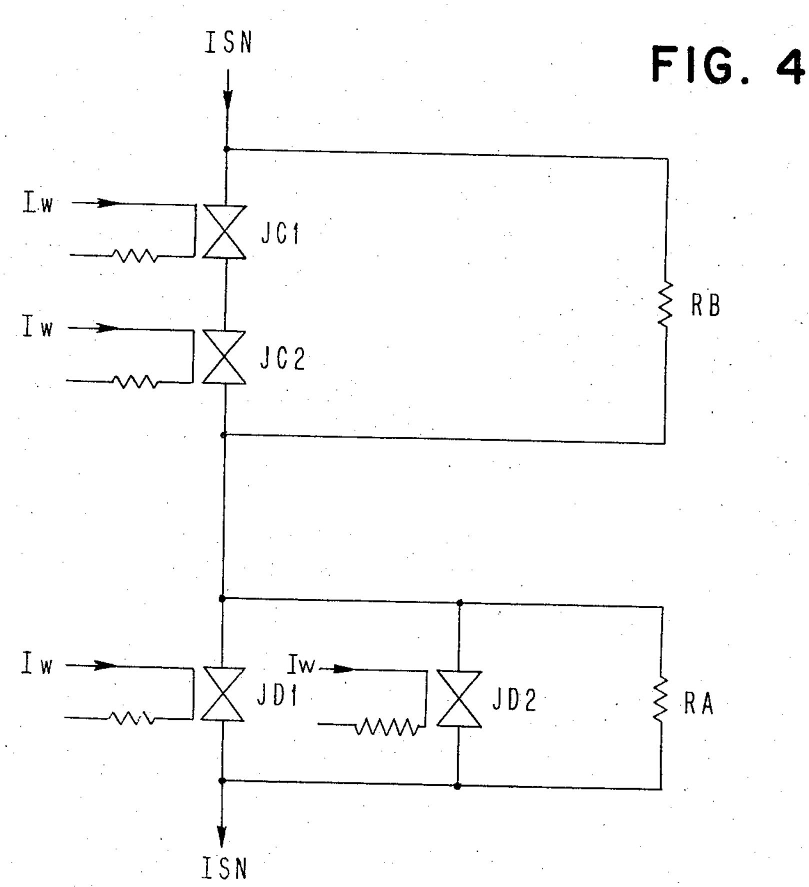
FIG. 4 is a schematic diagram showing the connection of the sensing means.

A first and second Josephson tunnelling junction sensing means JC(1,2,3) JD(1,2,3) is associated with each of the branches 10,12 of each of the gates 1, 2 and 3. Referring to gate 1, it can be seen that Josephson junction JC1 is located adjacent the transmission line forming the first branch 10*a* of the gate while Josephson device JD1 is located adjacent the transmission line of branch 12*a*. Similarly, a Josephson device JC2 is located adjacent the transmission line of the first branch 10*b* of gate 2 and a Josephson device JD2 is located adjacent the transmission line of branch 12*b* of gate 2. These Josephson devices JC1, JD1, JC2 and JD2 are sensing devices for sensing whether the current is flowing through the associated branch circuit of the stage or gate. In other words, if the current is flowing through branch 10*a* of gate 1 and the sensing current pulse ISN is applied to the sensing Josephson device JC1, the Josephson junction JC1 will be placed in its finite voltage state. Any of the other sensing Josephson junctions JD1, JC2 and JD2 operate in the same manner. That is, it requires the simultaneous presence of the current Iw in the branch with which the junction is associated and the sensing current pulse ISN to switch the junction. It is important to note that the sensing Josephson junctions JC1 and JC2 are connected in series and the control conductor 20*c* having the characteristic impedance RB therein is connected across the series Josephson junctions JC1 and JC2 as can be seen more clearly in FIG. 4. The current ISN, if it is allowed to flow through the control conductor 20*c* associated with Josephson junction JB3 in gate 3, causes junction JB3 to switch to its finite voltage state allowing the current to flow through the opposite or first branch 10*c* of the gate 3. It should be appreciated, that either of the Josephson junctions JC1 and JC2, if in the finite voltage state, as described above, brought on by the simultaneous application of current flow in the associated branches 10*a*, 10*b* and the application of the current pulse ISN produces a situation in which the current ISN is allowed to flow through the control conductor 20*c* for the Josephson junction JB3, thus causing the gate 3 to be placed in the "1" condition representing that gate 1 or gate 2 is in its "1" condition. Identifying gates 1, 2 and 3 as A, B and C, respectively, the logic equation would be $C = A + B$ where the + sign indicates the OR function. The same result is applicable when both of the Josephson devices JC1 and JC2 are simultaneously in their finite voltage state. The Josephson junctions JD1 and JD2 used for sensing the current flow in the second branches 12*a*, 12*b* of gates 1 and 2 are connected in parallel as can best be seen from FIG. 4. The control conductor for Josephson junction JA3 of gate 3 is connected in parallel with the Josephson junctions JD1 and JD2. It can be seen, that the current ISN applied to the junctions JD1 and JD2 passes through either one of the parallel junctions that is in its 0 voltage state. The only time that the sensing current ISN is applied to the control conductor for Josephson junction JA3 is when both of the junctions JD1 and JD2 are in the finite voltage state. This can be represented as $\overline{C} = A \cdot B$ where · represents the "AND" function.

The current flowing in the control conductor 18*c* of the Josephson junction JA3 will cause the junction to switch to its finite voltage state, thus causing the current input thereto Iw to flow through the second branch 12c. JC3 and JD3 are further sensing junctions which sense the current in the associated branches 10*c*, 12*c*, respectively. These junctions JC3, JD3 are used as read-out devices which indicate the state of the associated gate. That is, whether the current flow is in the left or right branch indicating the "1" or "0" state, respectively.

The "1" state of gate 3 represents the OR function with respect to the inputs to gates 1 and 2. The "0" state represents the not OR function, but more importantly, gate 3 responds immediately to the input conditions to the first and second gates without the necessity of any reset pulse. The resistors RA and RB shown in the control conductor circuits 18*c* and 20*c*, respectively, are to prevent reflections and circulating currents which would interfere with the operation of the devices.

The operation of the OR circuit can be best appreciated from a number of examples. Assume a current pulse input is received on the control element conductor 18*a* associated with Josephson junction JA1 in the first branch 10*a* of gate 1. This pulse produces a magnetic field about control conductor 18*a* which couples to the Josephson device JA1 such that it switches to its finite voltage state. Accordingly, the current will pass through the second branch 12*a* putting the gate into the conducting state representing a "0" input. This "0" state of gate 1 will cause Josephson junction JD1 to also switch into its finite voltage state when the sensing current pulse ISN is applied to the junction JD1. Similarly, a logic current pulse input to the control conductor 20*a* associated with Josephson junction JB1 will switch the junction JB1 into its finite voltage state causing the current to flow in the other or first branch 10*a* of gate 1. Thus, the JC1 junction will be placed in its finite voltage state by the current flow in this first branch and the receipt of sensing pulse ISN. Thus, it can be seen that the input logic pulses to either control element 18*a*, 20*a* associated with junctions JA1, JB1 cause the gate to have current flow indicative of a "0" or "1" state, respectively.

The operation of gate 2 is exactly the same as gate 1 with the control elements 18*b*, 20*b* associated with JA2 and JB2 causing the gate 2 to conduct in the "0" or "1" state, respectively. Likewise, JC2 or JD2 will be placed in its finite voltage state depending on whether the current is flowing in its associated branch 10*b*, 12*b*. The important thing to note is that a "1" logic input to either of the gates 1 or 2 is immediately indicated in gate 3 which indicates an OR function.

It will be appreciated, that no reset pulse is necessary in connection with the OR circuit and that the circuit is relatively high speed since the speed is dependent on the switching of the Josephson devices. The self-resetting feature is automatic in that gate 3 changes with the changing conditions of the circuit. For example, if gate 1 conduction changes from the "1" condition conducting state to the "0" condition and gate 2 is already conducting in the "0" condition, gate 3 will change to the "0" condition.

Figure 2:
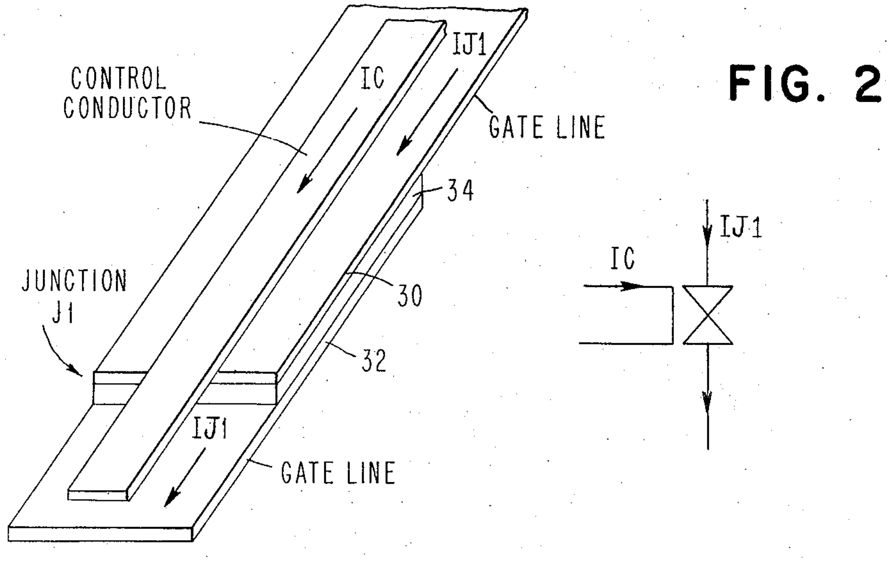
FIG. 2 is a diagram illustrating the structure of the Josephson tunnelling devices or junctions shown schematically in FIG. 1 and the circuit symbolism associated therewith.

The Josephson tunnelling junction used in FIG. 1 is illustrated in FIG. 2 and has a first and second superconducting electrode 30, 32 which is connected into the branch line or has a current such as the sensing current applied thereto. A tunnel barrier 34 is located between the electrodes 30, 32 across which Josephson current can tunnel. The first and second electrodes 30, 32 of each of these junctions and the barrier 34 therebetween are connected in series. Each of the Josephson tunnelling devices have the same construction. The electrodes are fabricated from known superconductive materials, such as lead or tin. Preferably, tunnel barrier 34 is an oxide of the base electrode, and can be, for instance, lead oxide. The manner of construction of a Josephson tunnelling junction is well understood in the art and will not be described further here. The branch circuitry is comprised of superconductive striplines. As with the electrodes of these Josephson devices, the striplines are deposited by known processes such as evaporation or sputtering. In FIG. 1, they are deposited on an insulative layer 16 which is located over superconductive ground plane 14. The control conductors are generally superconductive lines, although they need not be superconductive. If these control conductors are the output loops of other Josephson tunnelling circuits they will be superconductive lines.

Figure 3:
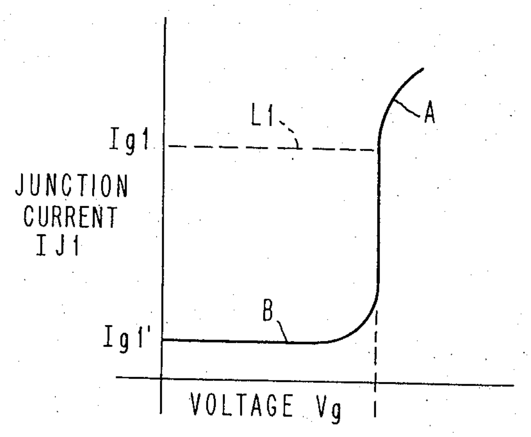
FIG. 3 is a plot of tunnel junction current versus tunnel junction voltage for a Josephson tunnel junction, used to illustrate the operation of the circuit shown in FIG. 1.

FIG. 3 shows the plot of Josephson junction current IJ1 through the Josephson tunnel junction J1 as represented in FIG. 2, plotted as a function of the voltage across junction J1. This plot shows the conventional curve denoting pair tunnelling through the junction in the "0" voltage state and single particle tunnelling through the junction in the finite voltage state. That is, current up to a magnitude of I*g*1 will flow through the junction in its "0" voltage state. When current IJ1 through the junction exceeds this critical value I*g*1, the junction will rapidly switch to a finite voltage state at which time the voltage across the junction will be the band gap voltage V*g*. When current to the junction is decreased to a value less than I*g*1′, the voltage across the junction will follow the curve indicated by portions A and B back to the "0" voltage state. The dotted line L1 will be used to explain the operation of the circuit of FIG. 2 when Josephson tunnel device J1 is switched in accordance with current applied to the control conductor. Assume that J1 is in its "0" voltage state and a current IJ1 equal to the critical current value I*g*1 flows through device J1. If a sufficient magnetic field now intercepts J1 such that the critical current value I*g*1 falls to a value less than IJ1, tunnel device J1 will immediately switch to a finite voltage state. The tunnel device J1 is switched to a finite voltage state represented by a path given by line L1. If the current IJ1 is lowered such that it is less than I*g*1′, tunnel device J1 will switch back to its "0" voltage state.

The logic OR circuit is designed to utilize the high speed characteristics of the Josephson devices. The necessity for a reset pulse and the accompanying extra logic circuitry is avoided.

While the invention has been particularly shown and described with reference to a preferred embodiment thereof, it will be understood by those skilled in the art that various changes in form and detail may be made therein without departing from the spirit and scope of the invention.

What is claimed is:

1. A logical OR circuit using Josephson tunnelling devices comprising:

a first, second and third gate;

a first and second branch circuit in parallel included in each of said gates;

a first Josephson tunnelling device located in the first branch circuit and a second Josephson tunnelling device located in the second branch of each of said first, second and third gates;

a source of DC current applied to each of said first, second and third gates;

control means for selectively applying inputs to said first and second Josephson devices in each of said gates to cause the selected devices to switch to their finite voltage state causing said input current to flow in the other one of the said first and second branch circuits;

first sensing means located adjacent the first branch of said first, second and third gates for sensing the current flow in said first branches;

connecting means connecting the first sensing means of the first branches of the first and second gates to the control means of the second branch of the third gate to switch the second Josephson device of said third gate to its finite voltage state if said sensing means senses current flow in one or more branches of said first branch of said first and second gates;

second sensing means located adjacent the second branches of said first, second and third gates for sensing the current flow in said second branches; and connecting means connecting the second sensing means of the second branches of the first and second gates to the control means of the first branch of the third gate to switch the first Josephson tunnelling device of said third gate to its finite voltage state if said sensing means senses current in both of said second branches of said first and second gates.

2. A logical OR circuit using Josephson tunnelling devices according to claim 1, wherein said current flow through said first branch circuits in each of said first, second and third gates represents the "1" state and the current flow through said second branch circuits in each of said first, second and third gates represents the "0" state.

3. A logical OR circuit using Josephson tunnelling devices according to claim 1, wherein said first and second Josephson tunnelling devices located in the first and second branches, respectively, of each gate are superconductive devices comprising a first and second electrode connected at one end thereof to the branch circuit in which they are located, an insulation barrier located between said electrodes at the other ends thereof through which Josephson tunnelling takes place.

4. A logical OR circuit using Josephson tunnelling devices according to claim 3, wherein said control means for applying inputs to each of said first and second Josephson devices in each of said gates comprises an electric conductor carrying a current pulse which is located with respect to its respective Josephson device so that magnetic coupling takes place causing the threshold current value to be lowered so that switching of the Josephson tunnelling device into its finite voltage state takes place.

5. A logical OR circuit using Josephson tunnelling devices according to claim 1, wherein said first and second branch circuits are superconductive stripline circuits.

6. A logical OR circuit using Josephson tunnelling devices according to claim 1, wherein said first sensing means and second second sensing means includes a sensing current source for applying sensing current pulses to said first and second sensing means of each gate so that the current in the associated branch can be sensed.

7. A logical OR circuit using Josephson tunnelling devices according to claim 6, wherein said first and second sensing means each include a further Josephson tunnelling device located adjacent its respective branch circuit so as to switch to its finite voltage state when the current is flowing in the associated branch and said sensing current is applied to the Josephson tunnelling device.

8. A logical OR circuit using Josephson tunnelling devices according to claim 1, wherein said first sensing means of the first and second gates are connected in series and respond to the current flow in one or both of the first branches of said first and second gates to provide a sensing current pulse to said control means for said Josephson tunnelling device in the second branch of said third gate switching it into its finite voltage state thereby causing the current to flow through the opposite branch in said third gate representing current flow in one or more of said first branches of said first and second gates representing an OR function.

9. A logical OR circuit using Josephson tunnelling devices according to claim 1, wherein said second sensing means of the first and second gates are connected in parallel and respond to the current flow in said second branch of both said first and second gates to provide an input to said control means for said first Josephson device of said third gate causing it to switch to its finite voltage state thereby causing said input current to said third gate to flow through the opposite branch thereof.

* * * * *